(12) United States Patent
Fujino et al.

(10) Patent No.: US 11,010,216 B2
(45) Date of Patent: May 18, 2021

(54) RPC CONVERSION PROCESSING SYSTEM AND RPC CONVERSION METHOD

(71) Applicant: NIPPON TELEGRAPH AND TELEPHONE CORPORATION, Tokyo (JP)

(72) Inventors: Tomoyuki Fujino, Musashino (JP); Yuji Oshima, Musashino (JP); Keiichiro Kashiwagi, Musashino (JP); Hisaharu Ishii, Musashino (JP); Yui Yoshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/471,542

(22) PCT Filed: Dec. 13, 2017

(86) PCT No.: PCT/JP2017/044727
§ 371 (c)(1),
(2) Date: Jun. 19, 2019

(87) PCT Pub. No.: WO2018/116933
PCT Pub. Date: Jun. 28, 2018

(65) Prior Publication Data
US 2019/0317847 A1    Oct. 17, 2019

(30) Foreign Application Priority Data
Dec. 22, 2016    (JP) .............................. JP2016-249752

(51) Int. Cl.
*G06F 9/54* (2006.01)
(52) U.S. Cl.
CPC .............. *G06F 9/547* (2013.01); *G06F 9/541* (2013.01); *G06F 9/546* (2013.01)

(58) Field of Classification Search
CPC . G06F 9/54; G06F 9/541; G06F 9/547; G06F 13/00; G06F 9/546
See application file for complete search history.

(56) References Cited

U.S. PATENT DOCUMENTS 5,675,805 A * 10/1997 Boldo ....................... G06F 8/30
717/114
6,105,059 A * 8/2000 Al-Karmi ............... G06F 9/548
709/202

(Continued)

FOREIGN PATENT DOCUMENTS

| JP | H11-65861 A | 3/1999 |
| JP | H11-119986 A | 4/1999 |
| JP | 2016-110318 A | 6/2016 |

OTHER PUBLICATIONS

International Search Report (in English and Japanese) issued in PCT/JP2017/044727, dated Feb. 13, 2018; ISA/JP.

(Continued)

*Primary Examiner* — Charles E Anya
(74) *Attorney, Agent, or Firm* — Harness, Dickey & Pierce, P.L.C.

(57) ABSTRACT

An RPC conversion processing system (10) that performs relaying between a first application (70) and second application (80) of different protocols. The RPC conversion processing system includes a first interface provider (20) connected to the first application and configured to provide a first interface for the first application, an RPC conversion relay function section (40), and a second interface provider (30) connected to the second application and configured to provide a second interface for the second application. The first interface provider receives a request for processing an RPC from the first application. The RPC conversion relay function section converts the RPC into an RPC of the second application and outputs the RPC of the second application to (Continued)

the second interface provider, thereby relaying an RPC between the first application and the second application.

4 Claims, 7 Drawing Sheets

(56) References Cited

U.S. PATENT DOCUMENTS

| | | | |
|---|---|---|---|
| 6,343,332 B1 | 1/2002 | Ueda | |
| 6,931,455 B1 | 8/2005 | Glass | |
| 7,373,632 B1 | 5/2008 | Kawaguchi et al. | |
| 2005/0273792 A1* | 12/2005 | Inohara | G06F 8/41 719/330 |
| 2008/0168479 A1* | 7/2008 | Purtell | G06F 9/45558 719/328 |
| 2015/0106428 A1* | 4/2015 | Elias | H04L 67/1008 709/203 |
| 2016/0004579 A1* | 1/2016 | Im | G06F 8/41 719/330 |
| 2016/0255168 A1* | 9/2016 | Fausak | H04L 67/40 709/203 |

OTHER PUBLICATIONS

International Preliminary Report on Patentability, including the English translation of the Written Opinion, regarding PCT/JP2017/044727, dated Jul. 4, 2019.

Japanese Office Action from counterpart JP2018557709, dated Jan. 14. 2020.

* cited by examiner

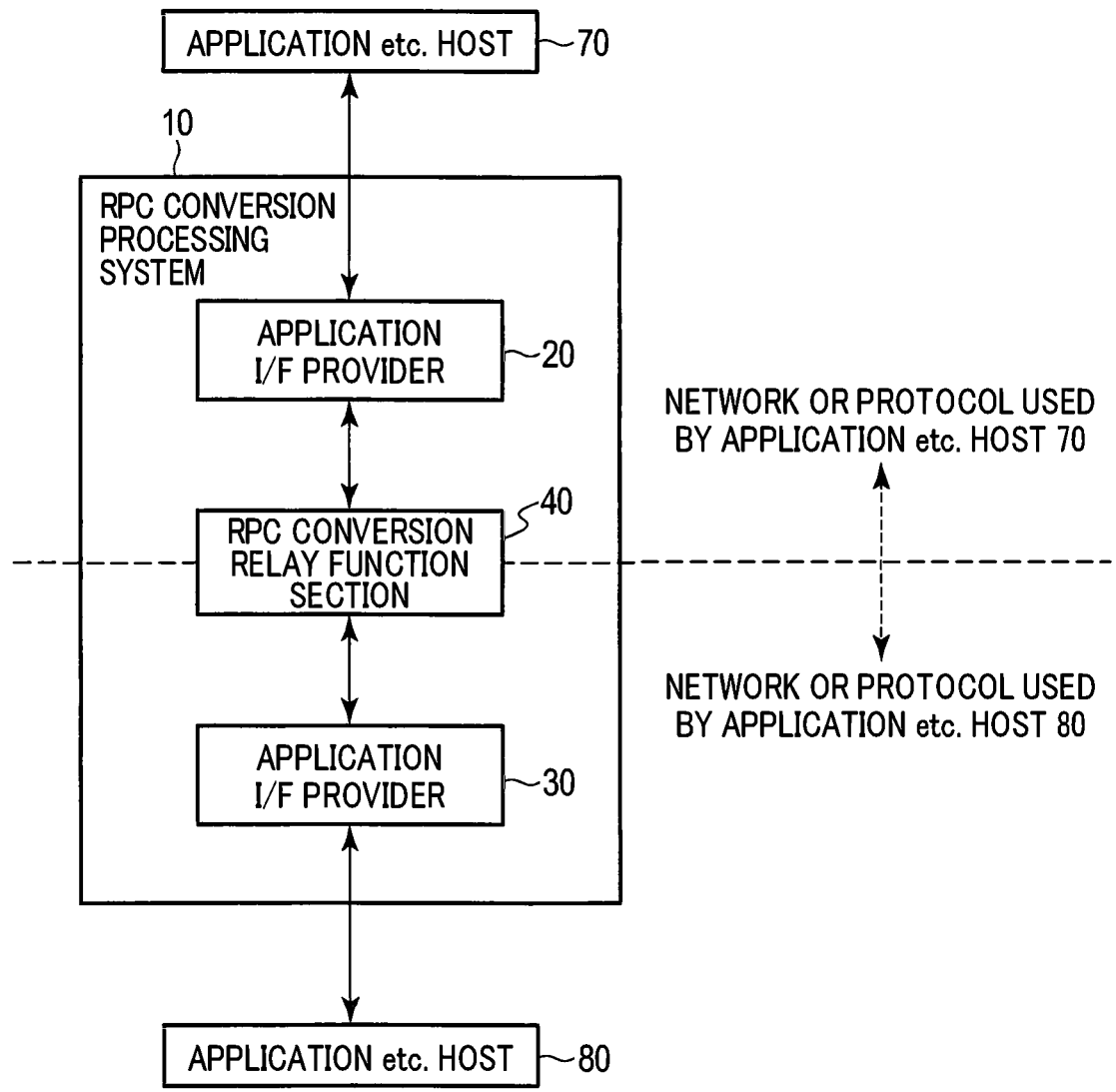
F I G. 1

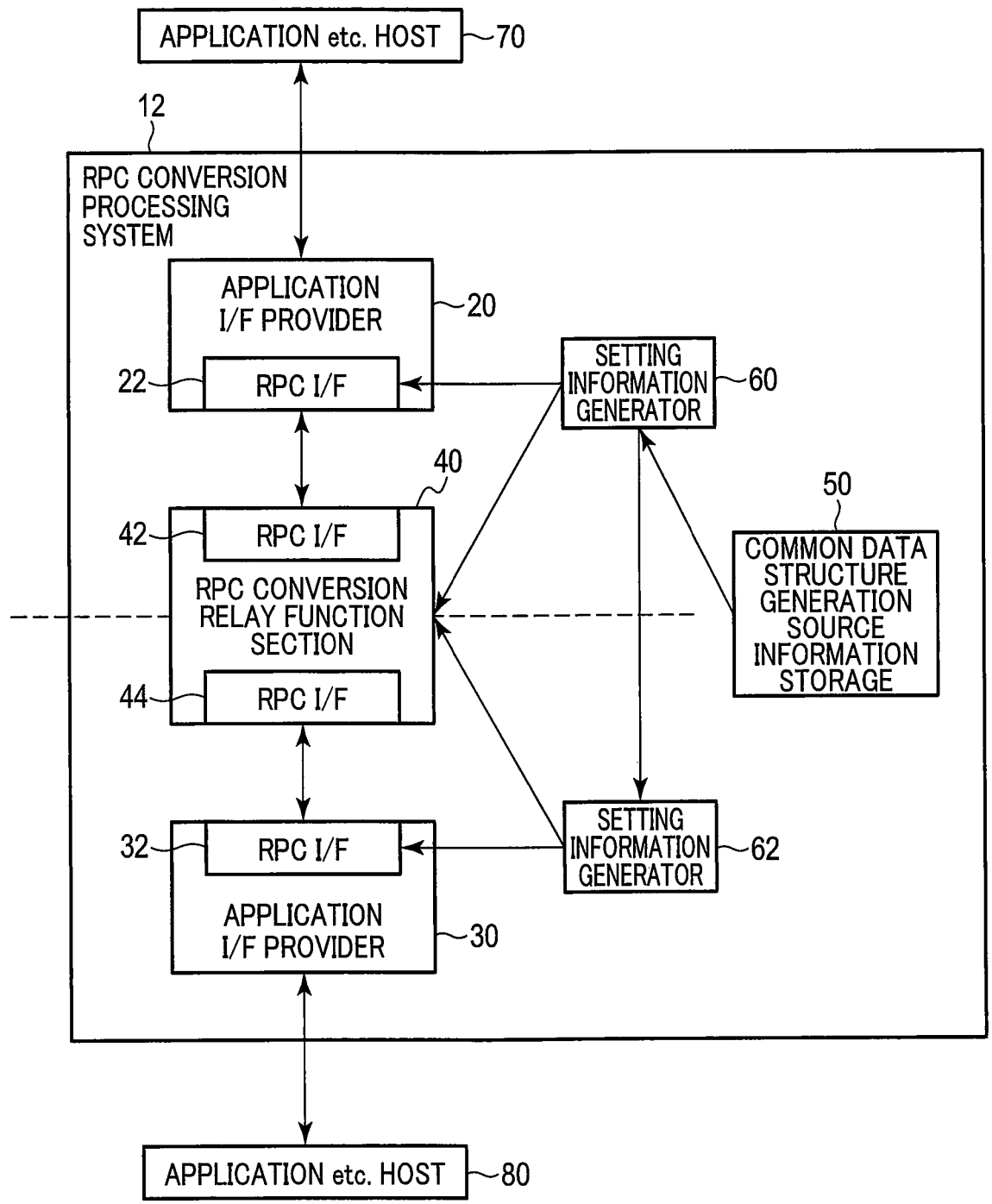
F I G. 2

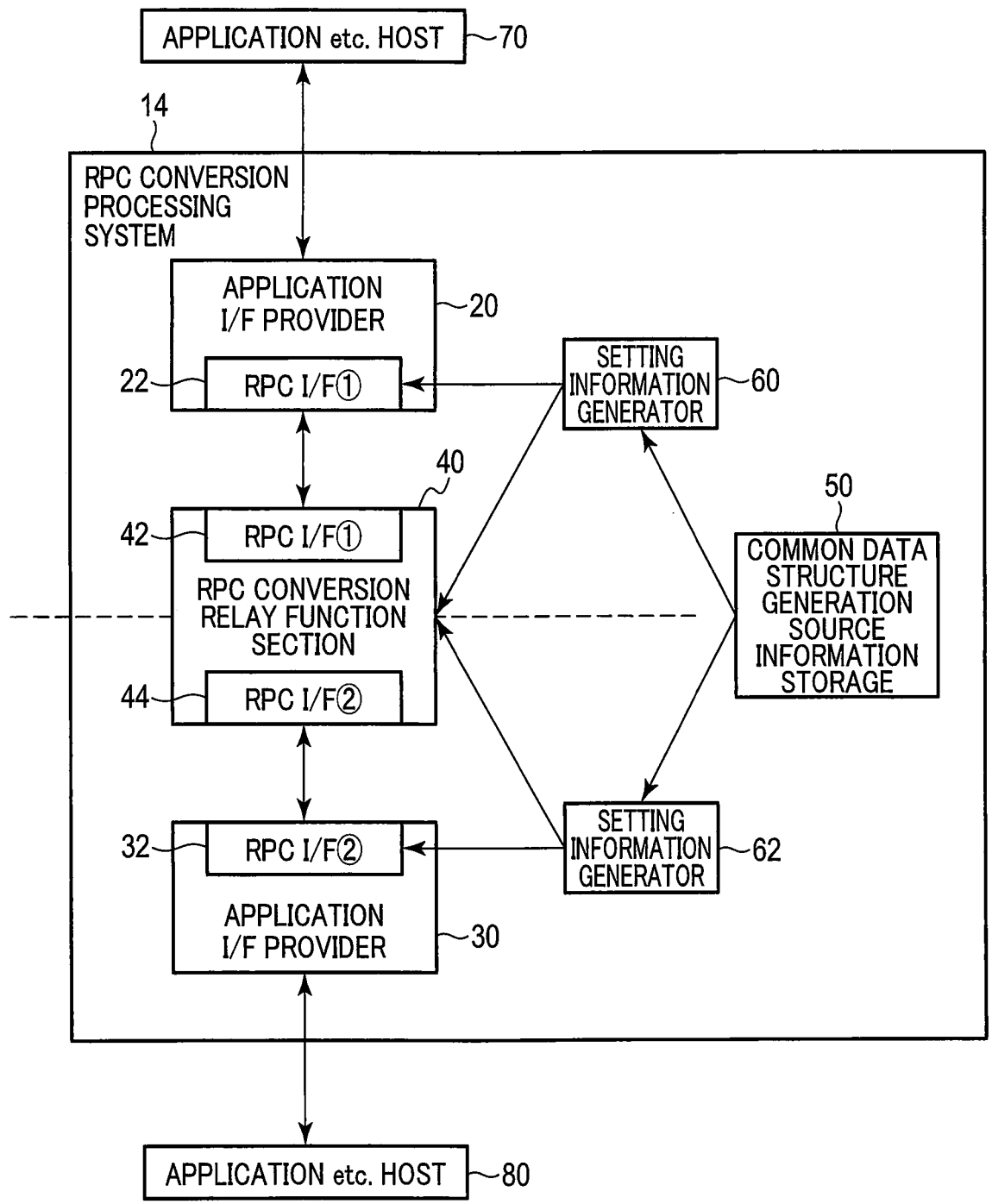
F I G. 3

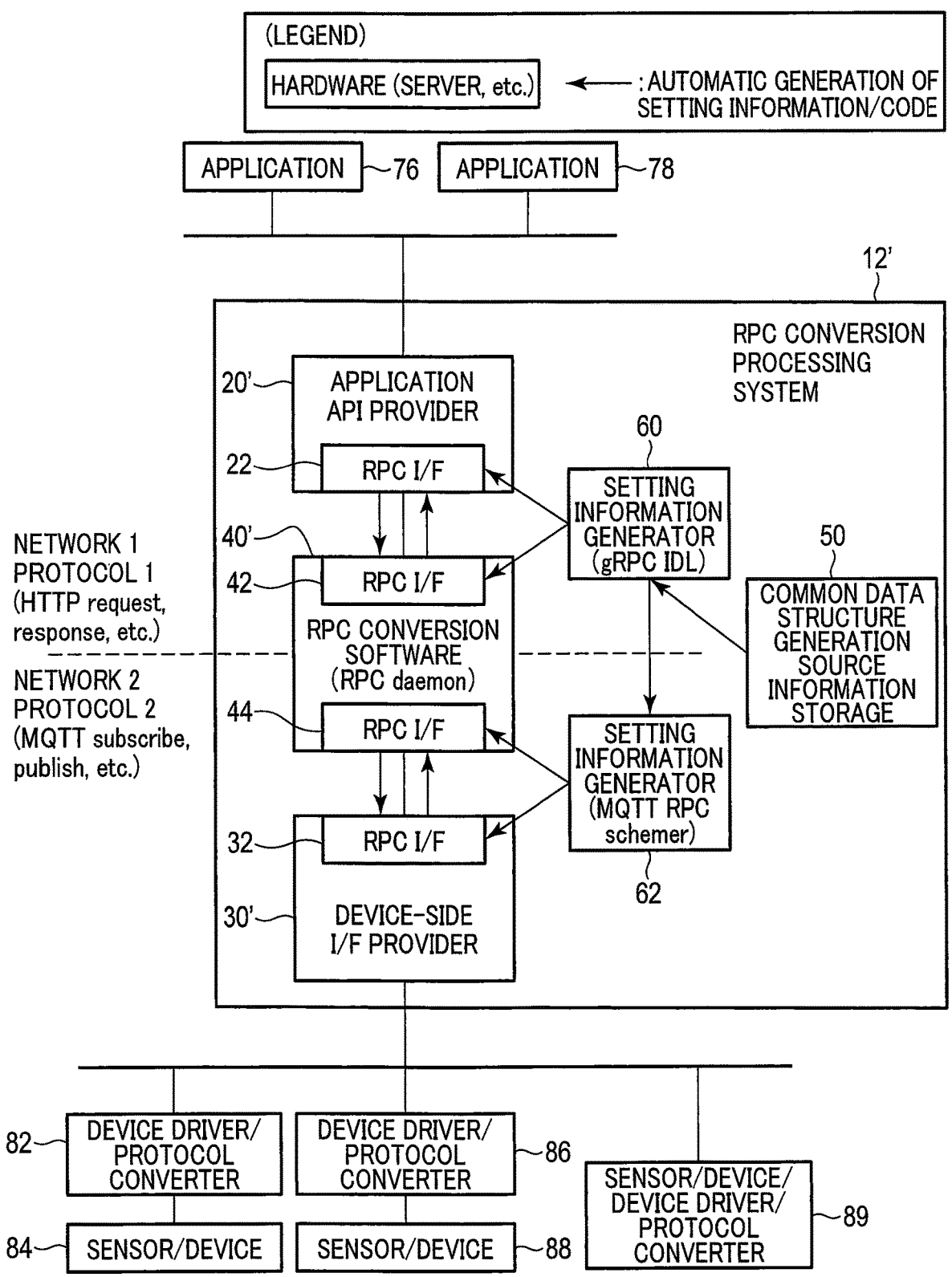
F I G. 4

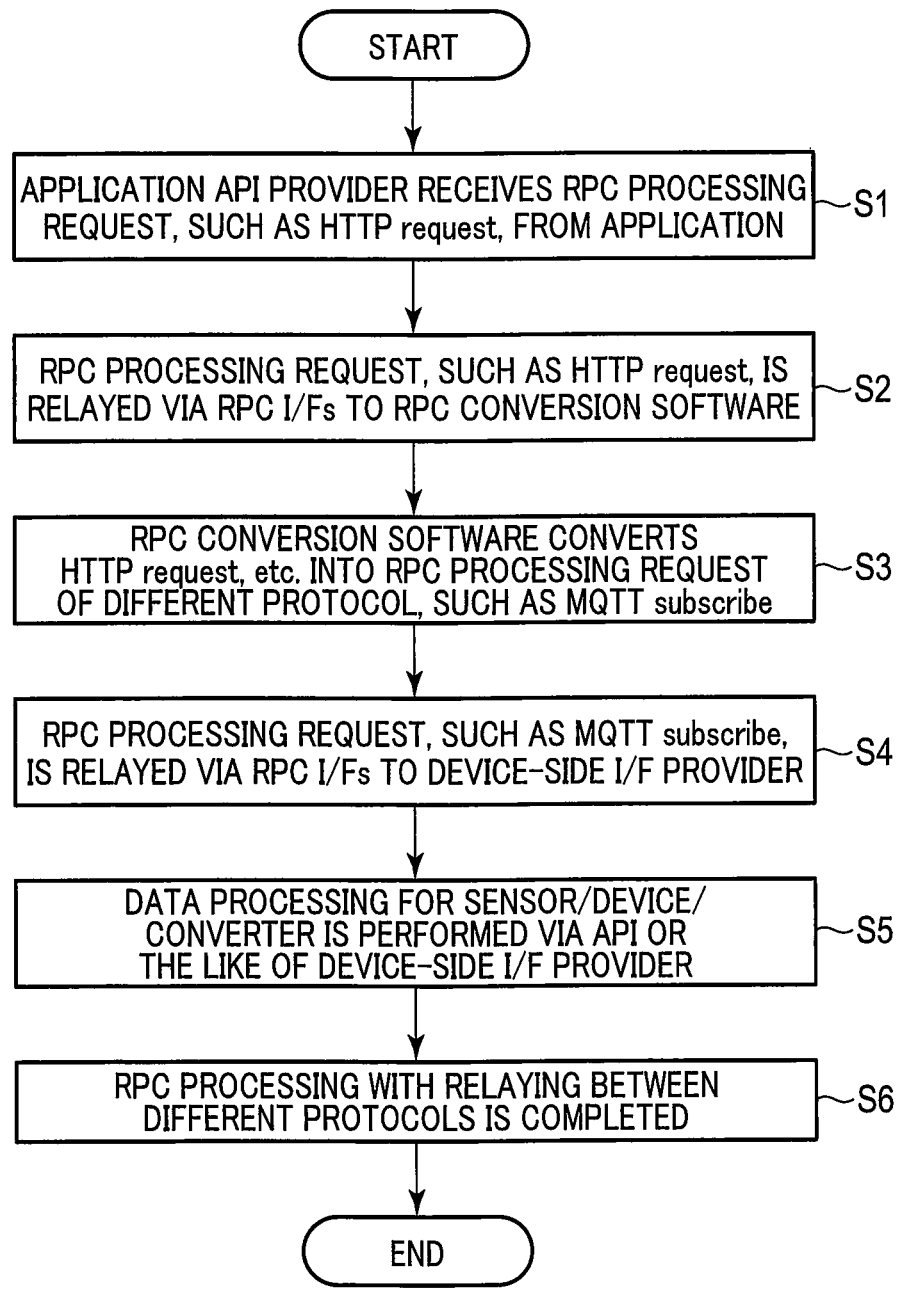
F I G. 5

RPC CONVERSION PROCESSING SYSTEM AND RPC CONVERSION METHOD

CROSS-REFERENCE TO RELATED APPLICATIONS

This is a U.S. National Phase Application under 35 USC 371 of International Application PCT/JP2017/044727 (not published in English), filed Dec. 13, 2017, which claims priority to Japanese Patent Application No. 2016-249752, filed on Dec. 22, 2016. The entire disclosures of the above applications are incorporated herein by reference.

FIELD

The present invention relates to an RPC conversion processing system and RPC conversion method applied to a data processing system, such as IoT, in which hosts, such as applications and devices, of different protocols or networks are connected, in order to enable data processing and control between hosts of different protocols or networks.

BACKGROUND

In recent years, IoT, which connects various sensors, devices, and the like to a network and utilizes data, has attracted attention. In the IoT, data is collected from various sensors, devices, and the like; therefore, the IoT requires an interface (hereinafter referred to as an "I/F") for enabling a common data processing system to process data generated by various sensors, devices, and the like.

Furthermore, data collected from these sensors, devices, and the like are used in many applications, but preparation of an individual I/F for each application is costly; therefore, an application I/F for enabling a common data processing system to provide data for various applications is required.

Moreover, as a utilization example of IoT, the way of controlling a device based on the result of data processing in an application is conceivable, which also requires control of a device from an application.

CITATION LIST

Patent Literature

[Patent Literature 1] Jpn. Pat. Appln. KOKAI Publication No. 2016-110318

SUMMARY

However, many existing applications generally exchange requests and responses with the server by using a protocol such as HTTP.

On the other hand, the protocols used by devices for communication include various protocols including legacy protocols, and communication based on HTTP is not always possible. In addition, when many applications simultaneously use data of many devices, or when data of various devices is centrally utilized, the system configuration in which applications and devices are on different networks and communication is performed via an intermediate server may be adopted.

There is a problem that it is difficult to control a device or the like from an application of a different protocol or network by a conventional technique of a single RPC, etc. In particular, in the IoT field, there is a demand for flexible execution of data processing, control, etc., between various applications and devices; however, applications and devices often use different protocols and networks, which makes it difficult to perform data processing and control by an RPC or the like of a single protocol.

In addition, there is a case where various sensors/devices/applications are connected to an IoT system, and their connection configuration or data type is changed; in that case, common information such as a data model is updated. The update of common information such as a data model may require prescription and development of RPC conversion software and RPC I/Fs for applications and devices, which also causes a problem of a heavy load of maintaining consistency between I/Fs and of confirming consistency between software or the like.

The RPC conversion processing system and RPC conversion method of the present invention have been made in view of such circumstances, and the first object thereof is to prescribe an RPC I/F between different protocols or networks, and perform control by converting/relaying an RPC of a protocol used by an application to an RPC of a protocol used by a device or the like.

The second object is to reduce the load of maintaining consistency of RPC conversion software and I/Fs and of confirming consistency between software or the like by automatically generating RPC conversion software and I/Fs for the application/device when common information such as a data model is updated.

According to a first aspect of the invention, there is provided an RPC conversion processing system that performs relaying between a first application and second application of different protocols, the RPC conversion including system including:

a first interface provider connected to the first application and configured to provide a first interface for the first application;

an RPC conversion relay function section; and a second interface provider connected to the second application and configured to provide a second interface for the second application, wherein the first interface provider receives a request for processing an RPC from the first application, and the RPC conversion relay function section converts the RPC into an RPC of the second application and outputs the RPC of the second application to the second interface provider, thereby relaying an RPC between the first application and the second application.

According to a second aspect of the invention, there is provided the RPC conversion processing system according to the first aspect of the invention, wherein the first interface provider, the RPC conversion relay function section, and the second interface provider are included in the same container or virtual machine.

According to a third aspect of the invention, the RPC conversion processing system according to the first aspect of the invention, including the first application and the second application.

According to a fourth aspect of the invention, the RPC conversion processing system according to the first aspect of the invention, further including:

a storage configured to store common data structure generation source information which is common information based on which setting information is generated in the first interface provider, the second interface provider, and the RPC conversion relay function section;

a first setting information generator configured to generate first setting information to be provided to the first interface provider and the RPC conversion relay function section, based on the common data structure generation source information; and a second setting information generator configured to generate second setting information to be provided to the second interface provider and the RPC conversion relay function section, based on the common data structure generating source information.

According to a fifth aspect of the invention, there is provided the RPC conversion processing system according to the fourth aspect of the invention, wherein when the common data structure generation source information is updated, the first setting information generator updates the first setting information based on the updated common data structure generation source information, and the second setting information generator updates the second setting information based on the updated common data structure generation source information.

According to a sixth aspect of the invention, there is provided the RPC conversion processing system according to the fourth aspect of the invention, wherein the common data structure generation source information includes information of a prescribed data model or relation information relating to part of the data model, the first setting information defines the first interface in accordance with a protocol and network for connecting to the first application, and the second setting information defines the second interface in accordance with a protocol and network for connecting to the second application.

According to a seventh aspect of the invention, the RPC conversion processing system according to the first aspect of the invention, further including:

a storage configured to store common data structure generation source information which is common information based on which setting information is generated in the first interface provider, the second interface provider, and the RPC conversion relay function section;

a first setting information generator configured to generate first setting information to be provided to the first interface provider and the RPC conversion relay function section, based on the common data structure generation source information; and a second setting information generator configured to generate second setting information to be provided to the second interface provider and the RPC conversion relay function section, based on the first setting information.

According to an eighth aspect of the invention, there is provided the RPC conversion processing system according to the seventh aspect of the invention, wherein the common data structure generation source information includes information of a prescribed data model or relation information relating to part of the data model, the first setting information defines the first interface in accordance with a protocol and network for connecting to the first application, and the second setting information defines the second interface in accordance with a protocol and network for connecting to the second application.

According to a ninth aspect of the invention, there is provided the RPC conversion processing system according to the seventh aspect of the invention, wherein the RPC conversion processing system generates any or any combination or all of software for the first interface provider, the second interface provider, and the RPC conversion relay function section, based on the common data structure generation source information.

According to a tenth aspect of the invention, there is provided the RPC conversion processing system according to the seventh aspect of the invention, wherein when the common data structure generation source information is updated, the first setting information generator updates the first setting information based on the updated common data structure generation source information, and the second setting information generator updates the second setting information based on the updated first setting information.

According to an eleventh aspect of the invention, there is provided an RPC conversion processing method for implementing relaying between a first application and second application of different protocols by an RPC conversion processing system, wherein the RPC conversion processing system receives a request for processing an RPC from the first application, converts the RPC into an RPC of the second application, and provides the RPC of the second application to the second application, thereby relaying an RPC between the first application and the second application.

According to the RPC conversion processing system and RPC conversion method of the present invention, data processing and control between hosts of different protocols and networks in a data processing system connected to applications of different protocols or networks is enabled.

Moreover, when common information such as a data model is updated, the load of maintaining consistency of RPC conversion software and I/Fs for applications and of confirming consistency between software or the like can be reduced.

BRIEF DESCRIPTION OF THE DRAWINGS

FIG. 1 is a conceptual diagram showing a configuration example of an RPC conversion processing system to which an RPC conversion method of a first embodiment is applied.

FIG. 2 is a conceptual diagram showing a configuration example of an RPC conversion processing system to which an RPC conversion method of a second embodiment is applied.

FIG. 3 is a conceptual diagram for explaining a modification of the RPC conversion processing system to which the RPC conversion method of the second embodiment is applied.

FIG. 4 is a conceptual diagram for explaining an example of the RPC conversion processing system.

FIG. 5 is a flowchart showing the processing flow of an RPC conversion performed by the RPC conversion processing system.

DETAILED DESCRIPTION

Figure 6:
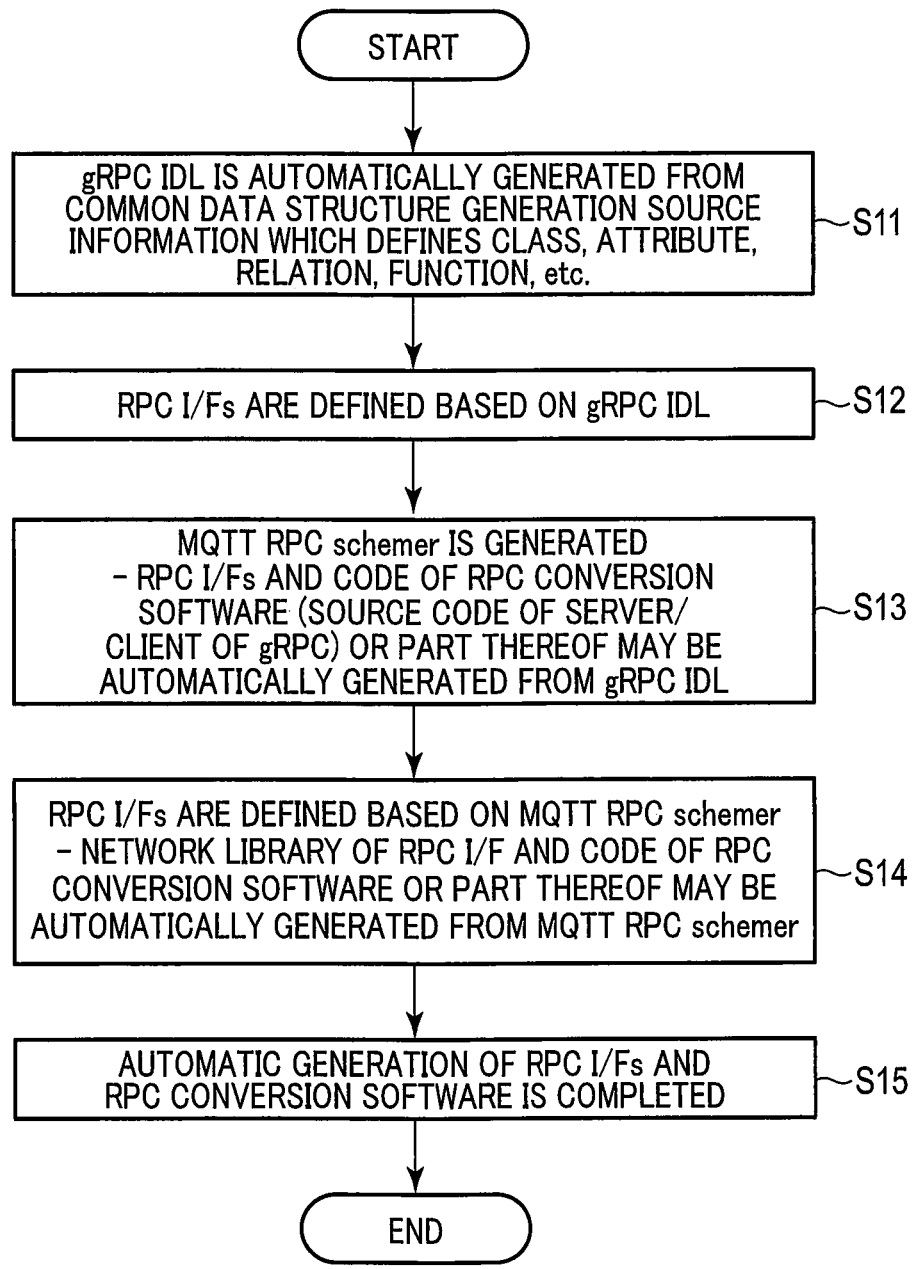
FIG. 6 is a flowchart showing a flow of processing performed by the RPC conversion processing system when automatically generating RPC I/Fs and RPC conversion software.

Hereinafter, an RPC conversion processing system to which an RPC conversion method according to each embodiment of the present invention is applied will be described with reference to the drawings.

First Embodiment

FIG. 1 is a conceptual diagram showing a configuration example of an RPC conversion processing system to which an RPC conversion method of a first embodiment of the present invention is applied.

The RPC conversion processing system 10 is a system for relaying between application etc. host 70 and application etc. host 80 of different protocols, and includes application interface (I/F) providers 20 and 30, and an RPC conversion relay function section 40.

Application I/F provider 20 is connected to application etc. host 70, which hosts an application, a sensor, a device, or the like, or is an application, a sensor, a device, or the like itself, and provides an interface, an API, or the like for application etc. host 70. Application I/F provider 20 also receives a request for processing an RPC from application etc. host 70, and outputs it to the RPC conversion relay function section 40.

The RPC conversion relay function section 40 converts the RPC output from application I/F provider 20 into an RPC for application etc. host 80, and relays the RPC to application I/F provider 30.

Therefore, the RPC conversion processing system 10 uses a network or protocol used by application etc. host 70 on the application I/F provider 20 side with respect to the RPC conversion relay function section 40, and uses a network or protocol used by application etc. host 80 on the application I/F provider 30 side with respect to the RPC conversion relay function section 40, while using the RPC conversion relay function section 40 as a boundary.

Application I/F provider 30 is connected to application etc. host 80, which hosts an application, a sensor, a device, a device driver/protocol converter, or the like, or is an application, a sensor, a device, a device driver/protocol converter, or the like itself, and provides an interface for application etc. host 80. Application I/F provider 30 also provides the RPC relayed by the RPC conversion relay function section 40 to application etc. host 80.

In this manner, the RPC conversion processing system 10 performs processing to convert and relay an RPC between applications and devices of different protocols/networks, such as between application etc. host 70 and application etc. host 80, with the system configuration in which the RPC conversion relay function section 40 is provided between two application I/F providers 20 and 30.

With the above-described configuration, the RPC conversion processing system 10 to which the RPC conversion method of the present embodiment is applied enables flexible data processing between different protocols/networks and, for example, control of a device from an application of a different protocol/network, or the like by an RPC conversion and relay between different protocols/networks.

Second Embodiment

FIG. 2 is a conceptual diagram showing a configuration example of an RPC conversion processing system to which an RPC conversion method of a second embodiment of the present invention is applied.

Regarding the RPC conversion processing system 12 shown in FIG. 2, the same parts as those of the RPC conversion processing system 10 shown in FIG. 1 are assigned with the same reference numerals, and different points will be described below while avoiding redundant explanations.

The RPC conversion processing system 12 has a configuration obtained by adding a common data structure generation source information storage 50, setting information generator 60, and setting information generator 62 to the configuration of RPC conversion processing system 10.

The common data structure generation source information storage 50 stores common data structure generation source information which is common information based on which setting information is generated in the application I/F providers 20 and 30 and the RPC conversion relay function section 40.

Based on the common data structure generation source information stored in the common data structure generation source information storage 50, setting information generator 60 generates first setting information to be provided to application I/F provider 20 and the RPC conversion relay function section 40.

The first setting information defines an RPC I/F 22 corresponding to the protocol/network of the application connected to application etc. host 70. The RPC conversion relay function section 40 includes an RPC I/F 42 which is the same I/F as RPC I/F 22. The first setting information is also used to automatically generate a code of the RPC conversion relay function section 40 (for example, RPC conversion software).

Based on the first setting information generated by setting information generator 60, setting information generator 62 generates second setting information to be provided to application I/F provider 30 and the RPC conversion relay function section 40.

The second setting information defines an RPC I/F 32 corresponding to the protocol/network of the application connected to application etc. host 80. The RPC conversion relay function section 40 includes an RPC I/F 44 which is the same I/F as RPC I/F 32. The second setting information is also used to automatically generate a code of the RPC conversion relay function section 40 (for example, RPC conversion software).

With the above-described configuration, the RPC conversion processing system 12 to which the RPC conversion method of the present embodiment is applied generates setting information used for definition of RPC I/Fs and automatic generation of RPC conversion software, based on the common data structure generation source information stored in the common data structure generation source information storage 50. This enables to maintain consistency between the RPC I/Fs, the RPC conversion software, and the setting information, and also enables reduction of the management operation that accompanies updating of the data model or the like.

Furthermore, reduction of the operation to maintain consistency between RPC I/Fs and RPC conversion software corresponding to a plurality of protocols, and their setting information is also enabled by generating information of IDL or the like of one protocol based on the common data structure generation source information, generating information of the schemer or the like of the other protocol based on the information of IDL or the like, and automatically generating RPC I/Fs and RPC conversion software corresponding to a plurality of protocols or part thereof based on the information of IDL and the schemer or the like.

(Modification)

FIG. 3 is a conceptual diagram for explaining a modification of the RPC conversion processing system to which the RPC conversion method of the second embodiment is applied.

The configuration of the RPC conversion processing system 14 shown in FIG. 3 is different from the configuration of the RPC conversion processing system 12 shown in FIG. 2 in the way of generating second setting information. That is, in RPC conversion processing system 12, when generating second setting information, setting information generator 62 takes into consideration the first setting information generated by setting information generator 60. On the other hand, in RPC conversion processing system 14, when generating second setting information, setting information generator 62 does not take into consideration the first setting information generated by setting information generator 60, and takes into consideration only the common data structure generation source information stored in the common data structure generation source information storage 50.

Even with such a configuration, the above-described reduction of the management operation that accompanies updating of the data model or the like, and reduction of the operation to maintain consistency between RPC I/Fs and RPC conversion software corresponding to a plurality of protocols, and their setting information are enabled.

EXAMPLE

A specific example corresponding to the above-described embodiments will be described.

FIG. 4 is a conceptual diagram for explaining an example which is a specific example of the RPC conversion processing system 12 shown in FIG. 2.

Therefore, in the following description, explanations overlapping those of FIG. 2 will be omitted.

In the RPC conversion processing system 12' of the example shown in FIG. 4, application I/F provider 20 in FIG. 2 is implemented as an application API provider 20', application I/F provider 30 is implemented as a device-side I/F provider 30', and the RPC conversion relay function section 40 is implemented as RPC conversion software 40' such as RPC daemon.

The application API provider 20', the device-side I/F provider 30', and the RPC conversion software 40' may be included in the same container or virtual machine in the RPC conversion processing system 12', or may be included in different containers or virtual machines in the RPC conversion processing system 12'.

As application I/F provider 30 is implemented as the device-side I/F provider 30', the device-side I/F provider 30' is connected to a plurality of device drivers/protocol device drivers/protocol converters 82 and 86 and a sensor/device/device driver/protocol device driver/protocol converter 89; furthermore, the device drivers/protocol device drivers/protocol converters 82 and 86 are connected to sensors/devices 84 and 88, respectively.

On the other hand, the application I/F provider 20' is connected to a plurality of applications 76 and 78. Applications 76 and 78 are provided on external hardware different from the RPC conversion processing system 12' or in a cloud.

Protocol 1 based on HTTP request, response, etc. is used on the application I/F provider 20' side, whereas protocol 2 based on MQTT subscribe, publish, etc. is used on the device-side I/F provider 30' side, while using the RPC conversion software 40' as a boundary.

The common data structure generation source information stored in the common data structure generation source information storage 50 is information of a prescribed data model or the like and relation information relating to part of the data model.

From such common data structure generation source information, setting information generator 60 automatically generates first setting information, which is IDL of gRPC, for applications 76 and 78. The IDL of gRPC is used to automatically define RPC I/F 22 in the application I/F provider 20' and RPC I/F 42 in the RPC conversion software 40'. Furthermore, the IDL of gRPC is used to automatically generate a code (source code of the server/client of gRPC) or part thereof in the RPC conversion software 40'.

From the IDL of gRPC generated by setting information generator 60, setting information generator 62 automatically generates second setting information, which is MQTT RPC schemer of the protocol, such as MQTT, of the device drivers/protocol device drivers/protocol converters 82 and 86. Furthermore, the MQTT RPC schemer is used to automatically define RPC I/F 32 in the device-side I/F provider 30' and RPC I/F 44 in the RPC conversion software 40'. The MQTT RPC schemer is also used to automatically generate a code of each of the network library of RPC I/Fs 32 and 44 and the RPC conversion software 40'.

Applications 76 and 78 send data to the application API provider 20' by using a protocol such as HTTP.

The device drivers/protocol converters 82 and 86 connected to the device-side I/F provider 30' may be device drivers/protocol converters or the like connected to the sensors/devices 84 and 88 and configured to convert the format of data therebetween.

The device drivers/protocol converters 82 and 86, the sensor/device/device driver/protocol converter 89, and the device-side I/F provider 30' may communicate with one another by using a protocol such as MQTT.

An RPC request based on the protocol such as HTTP from applications 76 and 78 is sent to the RPC I/F 42 of the RPC conversion software 40' via the RPC I/F 22 in the application API provider 20'.

The RPC conversion software 40' converts this RPC request in accordance with a protocol, such as MQTT, for the device drivers/protocol converters 82 and 86 and the sensor/device/device driver/protocol converter 89, and sends it from RPC I/F 44 to the RPC I/F 32 of the device-side I/F provider 30'.

The device-side I/F provider 30' sends this RPC request to the device drivers/protocol converters 82 and 86 and the sensor/device/device driver/protocol converter 89 by using a protocol such as MQTT. This RPC request is further sent from the device drivers/protocol converters 82 and 86 to the sensors/devices 84 and 88.

This realizes data processing using an RPC between different protocols, such as between applications 76 and 78, and the sensors/devices 84 and 88 and sensor/device/device driver/protocol converter 89.

Conversely, it is also possible for the device-side I/F provider 30' to provide data generated by the sensors/devices 84 and 88 and converted by the device drivers/protocol converters 82 and 86 or data generated by the sensor/device/device driver/protocol converter 89 to another data processing system such as applications 76 and 78 in a format, such as API, that can be processed in another data processing system such as applications 76 and 78.

Next, an operation of the RPC conversion processing system 12' will be described with reference to the flowcharts of FIGS. 5 and 6.

FIG. 5 is a flowchart showing the processing flow of an RPC conversion performed by the RPC conversion processing system 12'.

When an RPC conversion is performed by the RPC conversion processing system 12', an RPC processing request, such as HTTP request, from an application 76, 78 is received by the application API provider 20' (S1).

The RPC processing request, such as HTTP request, is relayed to the RPC conversion software 40' via RPC I/Fs 22 and 42 (S2).

The PRC processing request, such as an HTTP request, is converted by the RPC conversion software 40' into an RPC processing request of a different protocol such as MQTT subscribe (S3).

The RPC processing request, such as MQTT subscribe, is relayed to the device-side I/F provider 30' via RPC I/Fss 44 and 32 (S4).

Data processing for the devices/device drivers/protocol converters 82 and 86 is performed via the API or the like of the device-side I/F provider 30' (S5).

RPC processing with relaying between different protocols is completed (S6).

FIG. 6 is a flowchart showing a flow of processing performed by the RPC conversion processing system 12' when automatically generating RPC I/Fs and RPC conversion software.

When RPC I/Fs and RPC conversion software are automatically generated by the RPC conversion processing system 12', gRPC IDL is first automatically generated by setting information generator 60 from common data structure generation source information which defines a class, attribute, relation, function, etc. (S11).

Based on the gRPC IDL, RPC I/Fs 22 and 42 are defined (S12), and MQTT RPC schemer is generated by setting information generator 62 (S13). Furthermore, RPC I/F 42 and a code of the RPC conversion software 40' (source code of the server/client of gRPC) or part thereof may be automatically generated by the RPC conversion software 40' based on gRPC IDL.

Next, RPC I/Fs 32 and 44 are defined based on the MQTT RPC schemer. Furthermore, the network library of RPC I/F 44, the code of the RPC conversion software 40', or part thereof may be automatically generated by the RPC conversion software 40' based on the MQTT RPC schemer (S14).

Accordingly, the processing performed when automatically generating RPC I/Fs and RPC conversion software is completed (S15).

As described above, the RPC conversion processing system and RPC conversion method of the present invention enable flexibly performing, by using an RPC, data processing and control between hosts of different protocols or networks in a data processing system connected to hosts of applications, devices, or the like of different protocols or networks.

In addition, when common information such as a data model is updated, the load of maintaining consistency between I/Fs and that of confirming consistency between software or the like can be reduced by automatically generating I/Fs and IDLs for an application and for a device driver/protocol converter/sensor/device, schemer, and RPC conversion software.

The present invention is not limited to the above embodiments as they are, and can be embodied by modifying structural elements in the implementation stage without departing from the gist thereof. Various inventions can be formed by appropriate combinations of multiple structures disclosed in the above embodiments. For example, some structural elements may be deleted from all the structural elements described in the embodiments. Furthermore, structural elements over different embodiments may be appropriately combined.

For example, FIG. 4 shows the case where the applications 76 and 78, the device drivers/protocol converters 82 and 86 connected to the sensors/devices 84 and 88, and the sensor/device/device driver/protocol converter 89 are arranged outside the RPC conversion processing system 12'.

Figure 7:
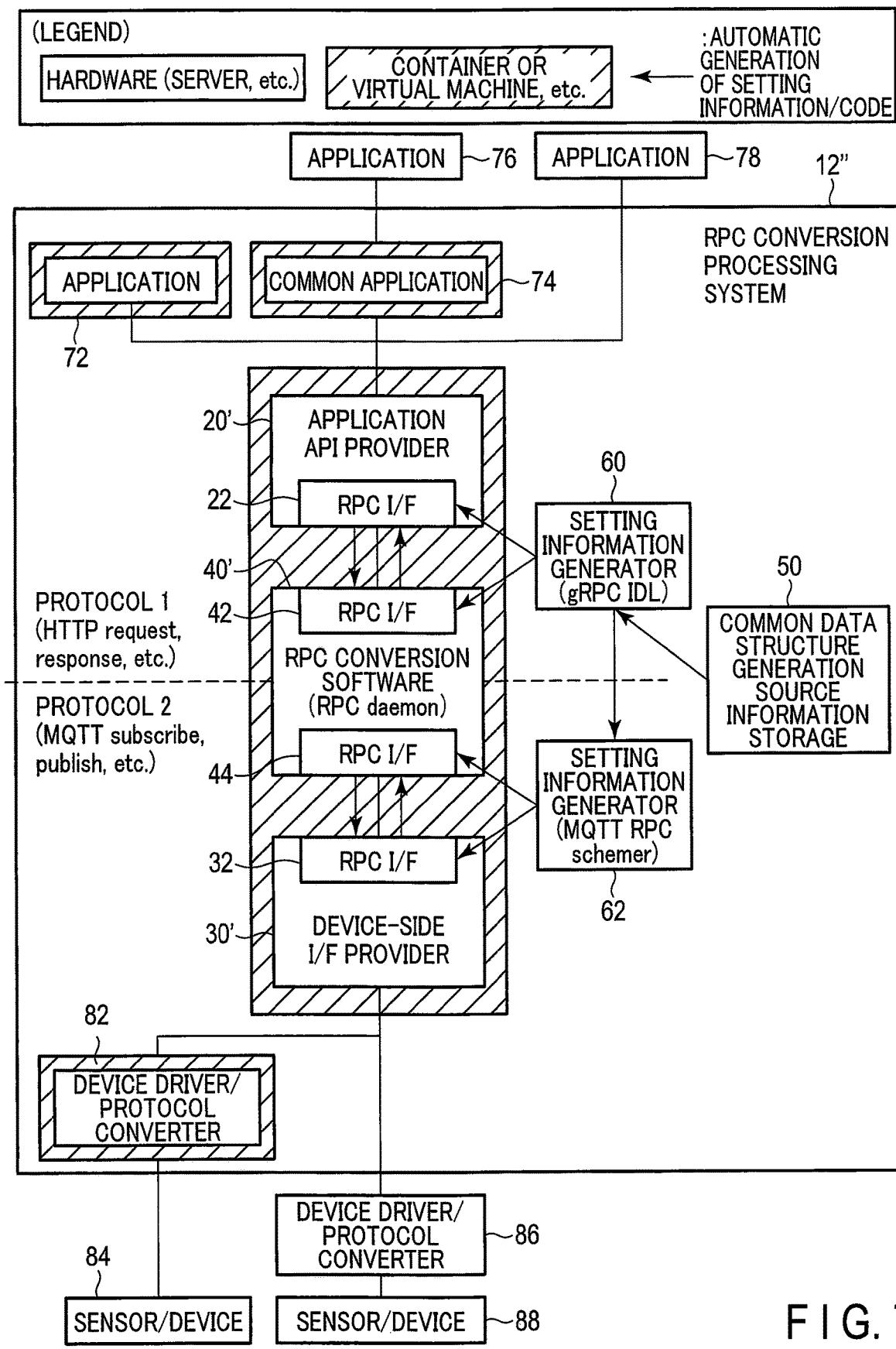
FIG. 7 is a conceptual diagram for explaining a modification of the example of the RPC conversion processing system.

However, like application 72, the common application 74 which provides a basic function to application 76, and the device driver/protocol converter 82 connected to the sensor/device 84 as shown in FIG. 7, even when the applications and the device driver/protocol converter/sensor/device are arranged inside the RPC conversion processing system 12', the same functions can be performed, and the same advantageous effects can be produced.

Even when the application API provider 20', the device-side I/F provider 30', and the RPC conversion software 40' are included in the same container or virtual machine in the RPC conversion processing system 12", the same functions can be performed, and the same advantageous effects can be produced.

The invention claimed is:

1. A Remote Procedure call (RPC) conversion processing Internet of Things (IOT) system that performs relaying between a first application and second application of different protocols and reduces a load of maintaining consistency of interfaces and RPC conversion software, the RPC conversion processing IOT system comprising:
   a first interface provider that is connected to the first application and provides a first interface for the first application;
   an RPC conversion relay function section;
   a second interface provider that is connected to the second application and provides a second interface for the second application;
   a storage that stores common data structure generation source information which is common information bases on which setting information is generated in the first interface provider, the second interface provider, and the RPC conversion relay function section;
   a first setting information generator that generates first setting information to be provided to the first interface provider and the RPC conversion relay function section, based on the common data structure generation source information; and
   a second setting information generator that generates second setting information to be provided to the second interface provider and the RPC conversion relay function section, based on the first setting information
   wherein the first interface provider receives a request for processing an RPC from the first application, and the RPC conversion relay function section converts the RPC into an RPC of the second application and outputs the RPC of the second application to the second interface provider, thereby relaying an RPC between the first application and the second application, and
   wherein when the common data structure generation source information is updated, the first setting information generator updates the first setting information based on the updated common data structure generation source information, the second setting information generator updates the second setting information based on the updated first setting information, and reducing the load of maintaining consistency between interfaces and that of confirming consistency between the RPC software based on the updated common data structure generation source information.

2. The RPC conversion processing system according to claim 1, wherein
the common data structure generation source information includes information of a prescribed data model or relation information relating to part of the data model,
the first setting information defines the first interface in accordance with a protocol and network for connecting to the first application, and
the second setting information defines the second interface in accordance with a protocol and network for connecting to the second application.

3. The RPC conversion processing system according to claim 1, wherein
the RPC conversion processing system generates any or any combination or all of software for the first interface provider, the second interface provider, and the RPC conversion relay function section, based on the common data structure generation source information.

4. A Remote Procedure call (RPC) conversion processing method for implementing relaying between a first application and second application of different protocols and reducing a load of maintaining consistency of interfaces and RPC conversion software by an RPC conversion processing Internet of Things (IOT) system including a first application provider, an RPC conversion relay function section, and a second application provider, the RPC conversion processing method of the RPC conversion processing IOT system comprising:

storing common data structure generation source information which is common information based on which setting information is generated in the first interface provider, the second interface provider, and the RPC conversion relay function section,
generating first setting information to be provided to the first interface provider and the RPC conversion relay function section, based on the common data structure generation source information,
generating second setting information to be provided to the second interface provider and the RPC conversion relay function section, based on the first setting information,
receiving a request for processing an RPC from the first application in the first interface provider,
converting the RPC into an RPC of the second application in the RPC conversion relay function section,
providing the RPC of the second application to the second application in the second interface provider, thereby relaying an RPC between the first application and the second application, and
when the common data structure generation source information is updated, updates the first setting information based on the updated common data structure generation source information, updates the second setting information based on the updated first setting information, and reducing the load of maintaining consistency between interfaces and that of confirming consistency between the RPC software based on the updated common data structure generation source information.

* * * * *